United States Patent [19]

Borba

[11] Patent Number: 4,848,221
[45] Date of Patent: Jul. 18, 1989

[54] APPARATUS FOR PROCESSING FAVA BEAN SEEDS

[75] Inventor: Steven A. Borba, Gustine, Calif.

[73] Assignee: California Natural Snacks, Inc., San Jose, Calif.

[21] Appl. No.: 115,157

[22] Filed: Oct. 30, 1987

[51] Int. Cl.⁴ ............................................. A23N 5/00
[52] U.S. Cl. ...................................... 99/625; 51/140; 99/568; 99/574; 99/616; 99/628; 460/144
[58] Field of Search ................ 99/568, 574, 575, 579, 99/616, 623–625, 628; 426/482, 481; 51/140; 130/30 J

[56] References Cited

U.S. PATENT DOCUMENTS

| | | |
|---|---|---|
| 59,324 | 10/1866 | Wathew . |
| 1,350,050 | 8/1920 | Kennedy . |
| 1,623,739 | 4/1927 | Macfarlane . |
| 1,791,362 | 2/1931 | La Forge . |
| 2,433,730 | 12/1947 | Bridge . |
| 3,745,913 | 7/1973 | Hobbs . |
| 4,621,572 | 11/1986 | Boggiano ............................. 99/574 |
| 4,680,192 | 7/1987 | Bogginao ............................. 99/574 |

Primary Examiner—Timothy F. Simone
Attorney, Agent, or Firm—Irell & Manella

[57] ABSTRACT

Method and apparatus remove the seed membrane from fava bean seeds and similar beans. The apparatus has a pair of continuous belts which define a fixed space, into which space said seeds are fed. The seeds travel between said belts, which are engaged in the same direction but at differential speeds. The frictional movement caused by the moving belts tears the seed membrane from the seed and splits the seed into component halves.

7 Claims, 2 Drawing Sheets

APPARATUS FOR PROCESSING FAVA BEAN SEEDS

TECHNICAL FIELD OF THE INVENTION

This invention relates generally to an apparatus and method of processing beans or the like and more particularly to the removal of the seed membrane and separation of the seed into two halves.

BACKGROUND OF THE INVENTION

The commercial marketability of various types of beans largely depends on the ability to expeditiously and economically separate the beans from the pods. A number of patents address this problem including U.S. Pat. Nos. 4,621,572 and 4,680,192. In addition, a number of methods using an apparatus to blanch and peel the skin from nuts such as almonds, are available. See, for example, U.S. Pat. Nos. 59,324; 1,350,506; 1,623,739 and 2,433,730. However, for some beans, it is also desirable to remove the seed membrane from the edible seed and further, if so desired, to split the seed into its two component halves without incurring physical damage to these components in the process. To date, the conventional practice has been to manually remove the seed membrane from the seed and then split the seed using knives or the like, a process which is labor-intensive and time-consuming.

SUMMARY OF THE INVENTION

The apparatus and method of the present invention overcomes the problems of the prior art by insuring that the seed membranes of fava beans and the like can be removed from the seeds expeditiously and economically with the use of minimal labor and that the seeds can be separated into their component halves without damage to either seed component.

In a specific embodiment, the present invention provides a method of removing seed membranes from seeds. In this embodiment the invention places the seeds with the attached seed membranes on a first surface, engages a second surface against each seed membrane on a side of the seed membrane opposite the side engaged with the first surface while the seed membrane is maintained in contact with the first surface, maintains a uniform spacing between the first and second surfaces along a substantial linear extent of the two surfaces whereby the sides of the seeds with membrane are in constant contact with both surfaces, and moves the first and second surfaces at different speeds relative to one another to remove the seed membrane from the seed. In this embodiment the seed may also be split into two component halves.

In a preferred embodiment of this invention, membranes are removed form fava bean seeds, the first and second surfaces are opposed surfaces of belt-type conveyers, the surfaces are preferably made of rubber material, and rigid support maintains a substantially constant spacing between the two belts along the entire length and width of the belts in the portion of the belts which are engaged with the seed membranes. In a specific embodiment the spacing between the belts is maintained in the range of 1/16" to 3/16".

Methods and apparatus for removing seed membranes from seeds which incorporate the features described above and which are effective to function as described above, constitute further, specific objects of the present invention.

Other and further objects of the present invention will be apparent from the following description and claims and are illustrated in accompanying drawings which, by way of illustration, show preferred embodiments of the present invention and the principles thereof and what are contemplated for applying these principles. Other embodiments of the invention embodying the same or equivalent principles may be used, and structural changes may be made as desired by those skilled in the art without departing from the present invention and the purview of the appended claims.

BRIEF DESCRIPTION OF THE DRAWINGS

FIG. 1 shows how seeds with attached seed membranes are introduced into one end of the mechanism from a conveyor or hopper and are transported through and between two belt members while the seed membranes are removed from the seeds. FIG. 1 shows how the separated seeds and seed membranes are collected in a hopper at the other end of the apparatus.

DETAILED DESCRIPTION OF THE INVENTION

Figure 1:
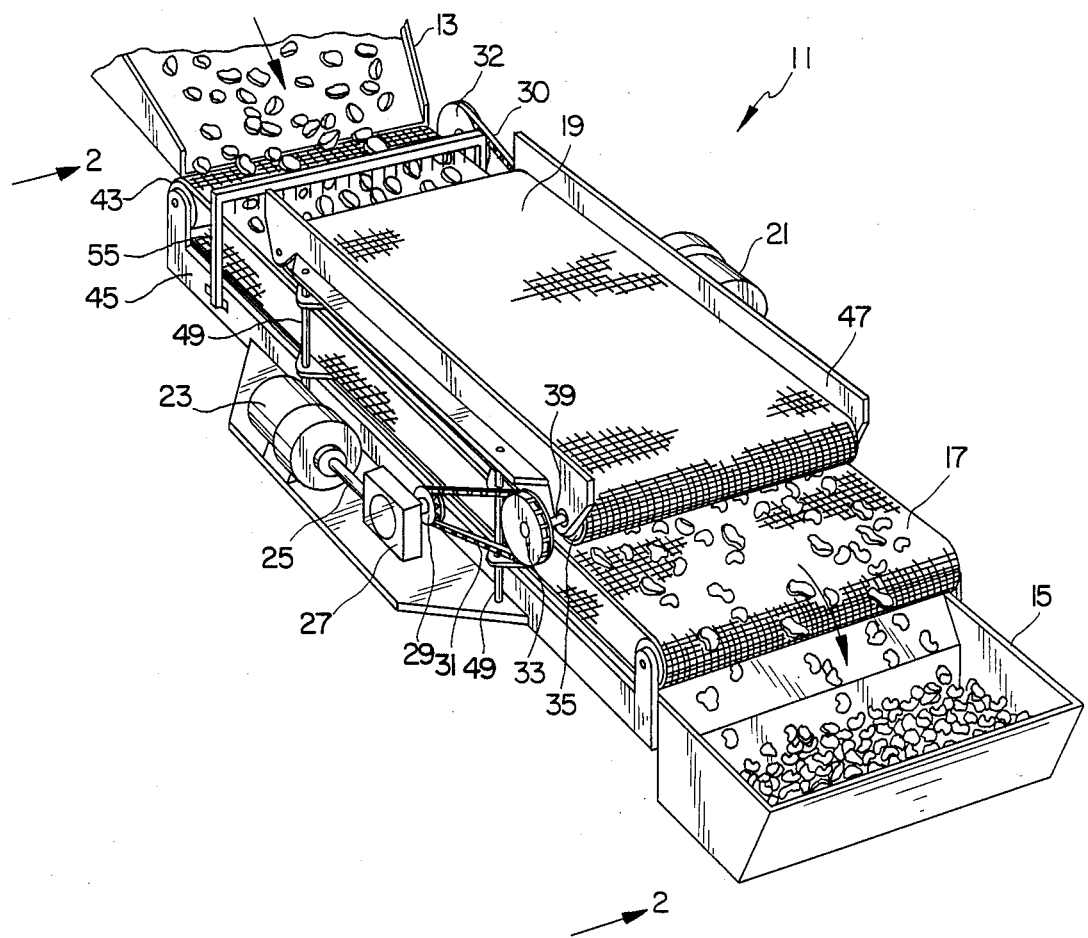
FIG. 1 is an isometric view of an apparatus constructed in accordance with one embodiment of the present invention.

In FIG. 1 an apparatus for removing seed membranes from seeds and constructed in accordance with one embodiment of the present invention is indicated generally by the reference numeral 11.

As illustrated in FIG. 1, the apparatus 11 includes a feed mechanism 13 for conducting seeds with attached seed membranes into an inlet of the apparatus 11 and a collector bin 15 for collecting the seeds and seed membranes after the seed membranes have been removed by the apparatus 11.

The parts of the apparatus 11 which are effective to remove the seed membranes from the seeds include a first belt 17 having an upper surface for supporting and conveying the seeds and seed membranes through the apparatus and a second belt 19 which has a surface engageable with each seed membrane on a side of the seed membrane opposite the side engaged with the surface of the belt 17.

The belts 17 and 19 are driven at different speeds to produce the separating action illustrated in FIG. 4, as will be described in more detail below.

Figure 4:
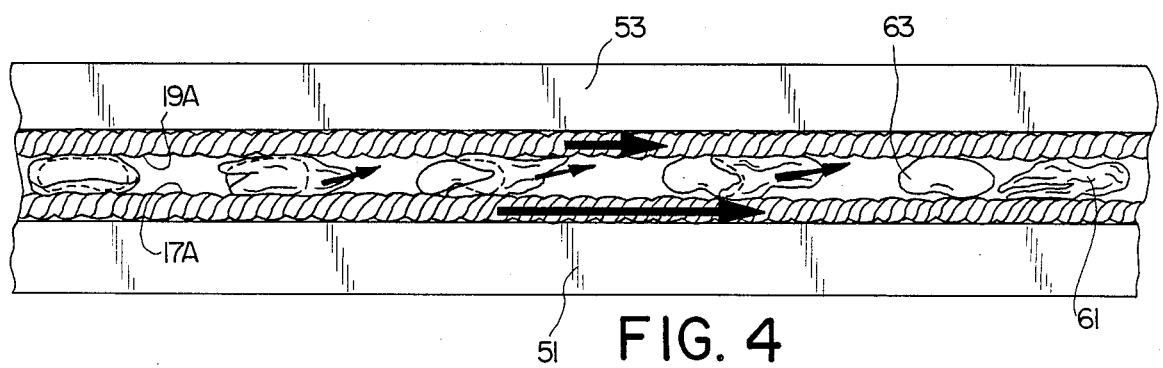
FIG. 4 is a fragmentary, enlarged view of the portion of the apparatus shown encircled by the arrows 4—4 in FIG. 2.

As best illustrated in FIG. 4, the belts 17 and 19 have opposed, spaced apart surfaces 17a and 19a which are effective to grip opposite sides of the seed membranes and, as a result of the difference in relative speeds of motion in these opposed surfaces, to strip and to remove the seed membranes from the seeds themselves. The belts 17 and 19 in one specific embodiment of the invention are made of textured rubber to grip the seed membrane.

The apparatus 11, in the embodiment illustrated in FIG. 1, also includes a drive motor 21 associated with the belt 17 and a drive motor 23 associated with the belt 19.

Figure 2:
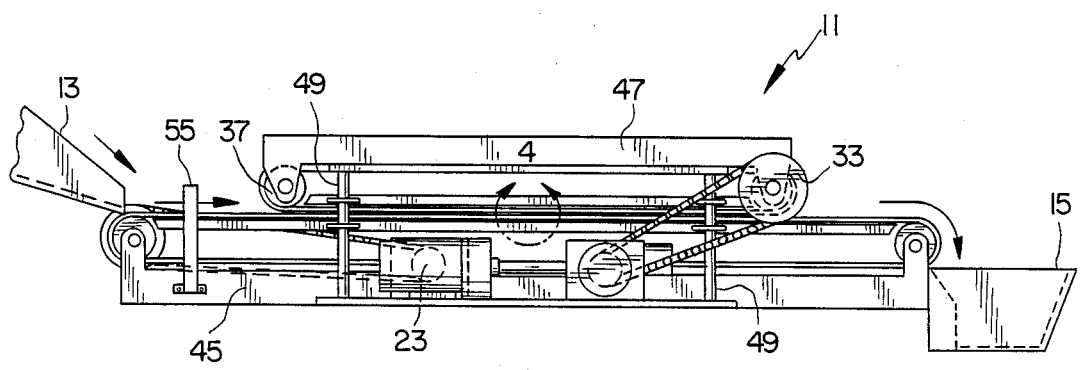
FIG. 2 is a side elevation view taken along the line and in the direction indicated by the arrows 2—2 in FIG. 1.

As shown in FIGS. 1 and 2, the drive motor 23 is connected to drive the belt 19 by means of a drive shaft 25, a gear box 27, a first chain drive sprocket 29, a drive chain 31 and a second chain drive sprocket 33.

Figure 3:
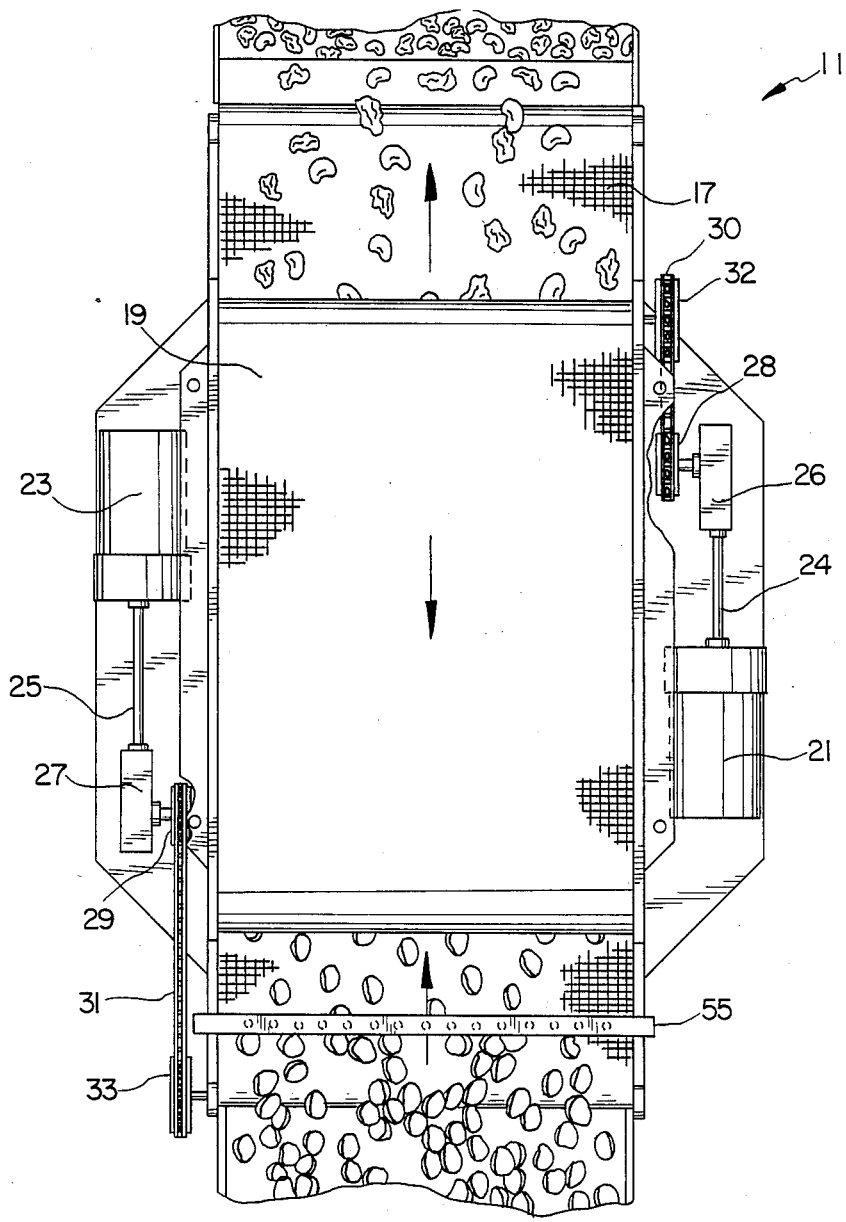
FIG. 3 is a top plan view of the apparatus shown in FIG. 1.

As shown in FIG. 3, the drive motor 21 is connected to drive the belt 17 through a similar arrangement as that described above with reference to drive motor 23. Thus, drive motor 21 is connected to drive the belt 17 by means of a drive shaft 24, a gear box 26, a first chain drive sprocket 28, a drive chain 30 and a second chain drive sprocket 32.

With continued reference to FIGS. 1 and 2, it can be seen that the belt 19 wraps around end rollers 35 and 37 so as to form a continuous belt. The end roller 35 is driven from the sprocket 33 by a shaft 39.

Similarly, the belt 17 wraps around end rollers 41 and 43 so as to form a continuous belt, and one of the end rollers 41 and 43 is driven by the drive motor 21.

The end rollers 41 and 43 are supported for rotation in bearing mounts in a lower frame 45. The end rollers 35 and 37 are supported for rotation in a upper frame assembly 47. The upper frame assembly 47 is mounted, by support members 49 on the lower frame 45.

While sprockets and chains have been shown and described, it should be noted that pulleys and V-belts can also be used to transfer the drive from the motor to the belts.

It is an important feature of the present invention that the surfaces 17a and 19a are maintained at a substantially uniform and fixed spacing throughout the length of the apparatus in which these two opposed surfaces are effective to engage the seed membranes. This uniformity of spacing is maintained by members 51 and 53 (as illustrated in FIG. 4) which extend alongside and engagement with the respective belts 17 and 19 on the sides of those belts which are opposite the sides engaged with the seed membranes. The spacing between the members 51 and 53 is adjustable and is maintained by the positioning of the supports 49 (see FIG. 1) which sets the height of the upper frame 47 with respect to the lower frame 45. While not illustrated in the drawings, the adjustment means may comprise threaded adjustment bolts and nuts for setting the spacing and then locking the spacing at the selected position.

The spacing must be set within a critical range for each type of seed being processed. For example, fava bean seeds will require spacing in the range of 1/16" to 3/16" between the surfaces 17a and 19a.

The drive motors 22 and 23 drive the belts 17 and 19 at different speeds so that the difference in the relative speeds between the belts, and the engagement of the surface at 17a with opposite sides of the seed membranes produce the separating action illustrated in FIG. 4 in which a seed membrane 61 is progressively stripped from and eventually completely separated from a seed 63 as illustrated in FIG. 4.

The apparatus 11 may optionally contain a spreader 55 to evenly distribute the seeds across the width of the belt. The spreader 55, as illustrated in FIGS. 1 and 2 is mounted to lower frame 45.

In a specific embodiment of the present invention, where fava bean seed membranes 61 are stripped from fava beans 63, the difference in speeds between the belts 19 and 17 is in the ratio of 3 to 1 with the upper belt being driven at a longitudinal, or linear, speed in the range of 10 to 12 feet per minute, preferably 11 feet per minute and the lower belt is driven at a linear speed of about 3.5 feet per minute. In other embodiments, the two surfaces may be driven in speed ratios in the range of 2.5:1 to 4:1. In a specific embodiment the belts are made of cross-top rubber and have textured surfaces 17a and 19a.

Prior to the operation of the method of the invention, dried beans are soaked in water where they are for a time sufficient to moisten the beans and loosen the membrane from the seed. The wet seeds are loaded on a feed mechanism 13 and conveyed to the first belt 17 and evenly distributed across the width of the first belt 17 by means of a spreader 55. The seeds are carried forward into the spacing between belts 17 and 19 by means of drive motors 21 and 23. Both belts run in the same direction to carry the seeds forward, the upper and lower belts being adjustable to apply sufficient pressure on the seeds as the seeds pass between the two moving belts. Preferably, the surfaces of each belt in contact with the seeds are kept damp with water to provide a better surface for gripping the seed membrane. The seeds travel forward through this space, maintaining contact with both belts, whereby the membrane is torn from the seed and the seed is split by the differential velocities of the two belts, causing a frictional movement similar to that caused during manual removal. Both the seed components and discarded membranes are recovered in a collector bin 15.

Upon separation from the membranes, the seeds are then available for further processing to create a snack food. In this embodiment of the invention, the separated seeds are deep-fried in a vegetable oil, preferably peanut oil, for about 8 minutes at 360° F. in a conventional fryer or, alternatively, for about 3x-4 minutes at 400° F. using a continuous fryer.

After deep-frying, the seeds are cooled and ready for consumption. In one embodiment of the invention, the seeds may be seasoned using a number of flavors including salted, garlic, chili or seasoned salt.

I claim:

1. Membrane removal apparatus for removing seed protective membranes from relatively fragile bean seeds, without damaging the relatively fragile seeds themselves, said membrane removal apparatus comprising, first belt means providing a substantially flat, planar, continuous first surface for engaging and for supporting bean seeds with attached seed membranes on said first surface, second belt means providing a substantially flat, planar, continuous second surface for engaging each bean seed membrane on a side of the seed membrane opposite the side engaged with the first surface while the seed membrane is maintained in contact with the first surface, spacer means for maintaining the first and second substantially flat, planar, continuous surfaces at a substantially uniform and fixed spacing from one another throughout a given linear distance in which the removal of a seed membrane can be achieved while a seed membrane and related bean seed, are engageable with said substantially flat, planar, continuous surfaces, and drive means for moving the first belt means and the second belt means at different speeds relative to one another to remove the seed membranes from the bean seeds as a result of the engagement of the first surface and the second surface with the seed membrane and the relative movement between the first surface and the second surface, whereby the seed membranes are effectively removed from the bean seeds continuously along the length of the said linear distance and at any and all locations across the width of the first and second substantially flat, planar, continuous surfaces and without damage to the relatively fragile bean seeds.

2. The invention defined in claim 1 wherein said spacer means maintains the space between the opposed portions of the substantially flat, planar, continuous surfaces at a distance which is effective to cause the first and second belt surfaces to engage an opposing side of the seed membrane with sufficient gripping force to prevent slipping of the belt surfaces with respect to the seed membrane surface.

3. The invention defined in claim 2 wherein the first and second belt means further include a rigid support for each of said belt means, and wherein said supports run substantially along the entire lengths and widths of the belt means in the portions of the belts which are engaged with the seed membranes to maintain a uniform exact spacing between the two belt surfaces in the portions of the belt surfaces which are engaged with the seed membrane.

4. The invention defined in claim 3 wherein the first and second belt means are arranged for movement in a horizontal direction, the first belt means is a lower surface, the second belt means is an upper surface, and wherein the drive means moves the first, lower belt surface faster than the second, upper belt surface.

5. The invention defined in claim 4 wherein the seeds are fava seeds and the spacing between the first and second belt surfaces is in the range of 1/16" to 3/16".

6. The invention defined in claim 5 wherein one belt surface is moved relative to the other belt surface at a speed ratzo in the range of 2.5:1 to 4:1.

7. Membrane removal apparatus for removing seed membranes from fava bean seeds, said membrane removal apparatus comprising, first and second belt members, each member providing a substantially flat, planar, continuous surface, which members are positioned to have opposed, facing surfaces over at least a substantial portion of their length so that the seeds with attached seed membranes can be fed into the space between the opposed portions of the belts, spacer means for maintaining the space between the opposed portions of the belts at a constant, rigidly supported distance effective to cause each belt to engage an opposing side of the seed membrane positioned in the space between the belts and with sufficient gripping force on the seed membrane to prevent slipping of the belt surface with respect to the seed membrane surface, drive means for moving one belt at a different longitudinal speed than the other belt so that the relative motion between the belts causes the seed membrane to be torn and removed from the seed as the belts are driven in relative motion, said drive means also being effective to drive at least one of the belts in a direction to convey the seed membranes and seeds through the space between the belts into and through the space between the belts.

* * * * *